(12) United States Patent
Nagase

(10) Patent No.: US 10,409,149 B2
(45) Date of Patent: Sep. 10, 2019

(54) PHOSPHOR WHEEL, LIGHT-EMITTING UNIT, AND PROJECTOR USING SAME

(71) Applicant: NEC Display Solutions, Ltd., Tokyo (JP)

(72) Inventor: Noriko Nagase, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/062,576

(22) PCT Filed: Jan. 19, 2016

(86) PCT No.: PCT/JP2016/051409
§ 371 (c)(1),
(2) Date: Jun. 14, 2018

(87) PCT Pub. No.: WO2017/126027
PCT Pub. Date: Jul. 27, 2017

(65) Prior Publication Data
US 2018/0364555 A1 Dec. 20, 2018

(51) Int. Cl.
*G03B 21/20* (2006.01)
*G03B 21/28* (2006.01)
(Continued)

(52) U.S. Cl.
CPC .............. *G03B 21/28* (2013.01); *F21K 9/64* (2016.07); *F21K 9/68* (2016.07); *F21S 10/007* (2013.01); *F21V 7/28* (2018.02); *G02B 26/008* (2013.01); *G03B 21/00* (2013.01); *G03B 21/14* (2013.01); *G03B 21/204* (2013.01)

(58) Field of Classification Search
CPC ......... G03B 21/28; G03B 21/204; F21K 9/64; F21K 9/68; F21V 7/28; F21S 10/007; G02B 26/008
See application file for complete search history.

(56) References Cited

U.S. PATENT DOCUMENTS

2010/0328632 A1* 12/2010 Kurosaki ............. G03B 21/204
353/98
2012/0127435 A1* 5/2012 Kitano ................. G03B 21/204
353/20
(Continued)

FOREIGN PATENT DOCUMENTS

JP    2011-129354 A    6/2011
JP    2011-164173 A    8/2011
(Continued)

OTHER PUBLICATIONS

International Search Report (ISR) (PCT Form PCT/ISA/210), in PCT/JP2016/051409, dated Mar. 22, 2016.

*Primary Examiner* — Sultan Chowdhury
*Assistant Examiner* — Magda Cruz
(74) *Attorney, Agent, or Firm* — McGinn I.P. Law Group, PLLC.

(57) ABSTRACT

A phosphor wheel has a phosphor-supporting surface on which is formed a phosphor that generates fluorescent light in response to the incidence of light; and a reflecting surface that reflects the incident light, the phosphor-supporting surface and the reflecting surface being formed both to be parallel to each other to have a distance between them in the perpendicular direction of each surface.

20 Claims, 3 Drawing Sheets

(51) Int. Cl.
*G02B 26/00* (2006.01)
*G03B 21/00* (2006.01)
*G03B 21/14* (2006.01)
*F21K 9/64* (2016.01)
*F21K 9/68* (2016.01)
*F21V 7/28* (2018.01)
*F21S 10/00* (2006.01)

(56) References Cited

U.S. PATENT DOCUMENTS

2015/0098065 A1* 4/2015 Tanaka ............... G03B 21/2013
  353/84
2016/0077415 A1* 3/2016 Motoya ............... G03B 21/204
  353/84

FOREIGN PATENT DOCUMENTS

| | | | |
|---|---|---|---|
| JP | 2012-212129 | A | 11/2012 |
| JP | 2013-047793 | A | 3/2013 |
| JP | 2014-021223 | A | 2/2014 |
| JP | 2014-157361 | A | 8/2014 |
| JP | 2014-160233 | A | 9/2014 |
| JP | 5618130 | B2 | 11/2014 |
| JP | 2015-028504 | A | 2/2015 |
| JP | 2015-092224 | A | 5/2015 |
| WO | WO 2014/109333 | A1 | 7/2014 |
| WO | WO 2015/111145 | A1 | 7/2015 |

\* cited by examiner

PHOSPHOR WHEEL, LIGHT-EMITTING UNIT, AND PROJECTOR USING SAME

TECHNICAL FIELD

The present invention relates to a phosphor wheel and to a light-emitting unit and projector that use this phosphor wheel.

BACKGROUND ART

Recent years have witnessed increasing restrictions upon mercury lamps due to the problem of environmental pollution. As a result, as a light source to replace mercury lamps, solid-state light-source projectors have been widely developed and marketed in which an extremely strong excitation light such as LD (Laser Diode) light is irradiated upon a phosphor wheel in which a phosphor is combined with a disk-shaped substrate to excite the phosphor and emit fluorescent light for use as a light source (for example, Patent Document 1 (JP 5618130 B)).

Further, with advances in technological development and the development of projectors having higher luminance, the need for higher-output fluorescence has made necessary LD that feature still higher light output. Because LD light has a small light-emitting point and extremely high directivity, high-power light can be focused upon an exceptionally small light-emitting point. A phosphor that emits perfectly diffuse light has a small light-emitting surface because excitation occurs on a smaller area of irradiation of LD light. As a result, etendue, which is an index of the utilization efficiency of light that is found from the light-emitting area and the radiation solid angle, can be reduced and fluorescent light can be used more efficiently.

The ability to use light efficiently brings about many advantages such as improved image quality, reduced need for cooling, lower power consumption, and lower cost. In other words, benefits increase with a decrease of the area of the LD light that is irradiated upon a phosphor.

RELATED ART DOCUMENTS

Patent Documents

Patent Document 1: JP 5618130 B

SUMMARY

Problem to be Solved by the Invention

Not all phosphor wheels are provided with phosphor at all positions of incidence of excitation light, and some phosphor wheels are configured such that some positions of incidence have reflecting surfaces or transmitting surfaces and the excitation light that is reflected or transmitted is used as a portion of the plurality of colored light sources. In the case of a phosphor wheel having this type of configuration, the small area of irradiation of LD light on a reflecting surface or transmitting surface means that the power density of the LD light is high, whereby the load upon optical components becomes extremely high, deterioration accelerates, and the usable life of the phosphor wheel decreases. Although there are substrate materials and coating agents that feature resistance to LD light, these materials entail an increase in cost. Even when the light employed is not LD light, these problems similarly arise when extremely powerful excitation light is used.

The present invention realizes a phosphor wheel as well as a light-emitting unit and projector that use this phosphor wheel that, by both reducing the etendue of excitation light that is incident to the phosphor of a phosphor wheel and reducing the load upon optical components, not only increases luminance but also provides longer life and higher reliability.

Means for Solving the Problem

A phosphor wheel according to an exemplary aspect of the present invention includes a phosphor-supporting surface on which is formed phosphor that emits fluorescent light in response to incident light and a reflecting surface that reflects the incident light;

wherein the phosphor-supporting surface and the reflecting surface are formed to both be parallel and have a distance between them in the perpendicular direction of each surface.

A light-emitting unit according to an exemplary aspect of the present invention has:

the above-described phosphor wheel;

a light source that supplies light that is the incident light;

a mixing optical system that reflects output light of the light source in the direction of the phosphor wheel and that transmits the fluorescent light and the reflected light that are emitted by the phosphor wheel; and a lens that causes the output light of the light source to form a focal point on the surface of the phosphor, wherein the light-emitting unit supplies as output the fluorescent light and reflected light that were emitted by the phosphor wheel that have been transmitted through the mixing optical system.

A projector according to an exemplary aspect of the present invention has:

the above-described light-emitting unit; and an image projection unit that uses the fluorescent light and reflected light that were emitted by the phosphor wheel that were supplied from the light-emitting unit to form and project image light.

EXEMPLARY EMBODIMENT

Exemplary embodiments of the present invention are next described with reference to the accompanying drawings.

First Exemplary Embodiment

Figure 1:
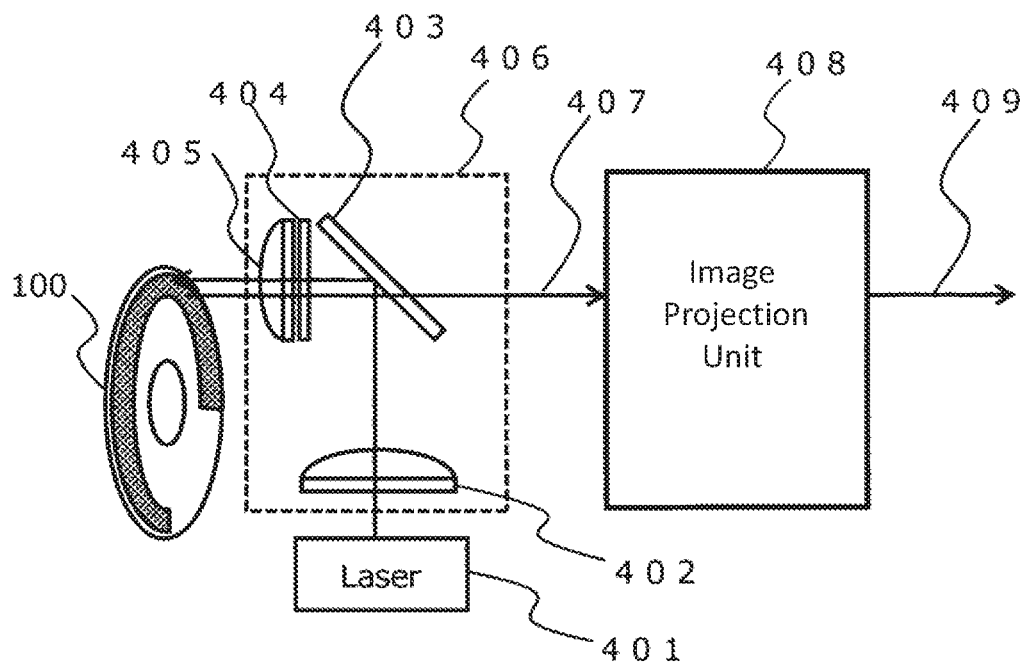
FIG. 1 is a block diagram showing the configuration of an exemplary embodiment of the projector according to the present invention.

FIG. 1 is a block diagram showing the configuration of an exemplary embodiment of the projector according to the present invention.

The projector of the present exemplary embodiment is made up from phosphor wheel 100, LD 401, optical component group 406, and image-forming unit 409. Phosphor wheel 100, LD 401, and optical component group 406 make up the light-emitting unit.

Optical component group 406 is made up of lenses 402 and 405, polarization beam splitter 403, and phase difference plate 404.

LD 401 emits blue LD light. LD light is known to generally be linearly polarized light. Accordingly, when LD 401 is rotated around the optical axis of the laser beam, the direction of polarization also rotates. In the projector of the present exemplary embodiment, LD 401 is arranged such that the LD light that is emitted by LD 401 is incident to polarization beam splitter 403 in the state of S-polarized light.

Polarization beam splitter 403 is a component in which is formed a dielectric multilayer film having the characteristic of transmitting P-polarized light and reflecting S-polarized light, and these transmissive and reflective characteristics are designed to be particularly favorable characteristics for blue light. In addition, polarization beam splitter 403 transmits yellow light regardless of the polarized light characteristic.

Phase difference plate 404 is a component that rotates the direction of linearly polarized light that is transmitted by a predetermined angle, S-polarized light being converted to P-polarized light and P-polarized light being converted to S-polarized light by two passages through phase difference plate 404.

Lenses 402 and 405 cause the LD light that is emitted by LD 401 to form a focal point on the surface of the phosphor that is provided on phosphor wheel 100. The lenses may be single lenses or may be three or more lenses.

LD light that is emitted by LD 401 that is configured as described above is incident to polarization beam splitter 403 via lens 402 in the state of S-polarized light, is reflected toward phosphor wheel 100 by polarization beam splitter 403, and then irradiated upon phosphor wheel 100 by way of lens 405.

Figure 2:
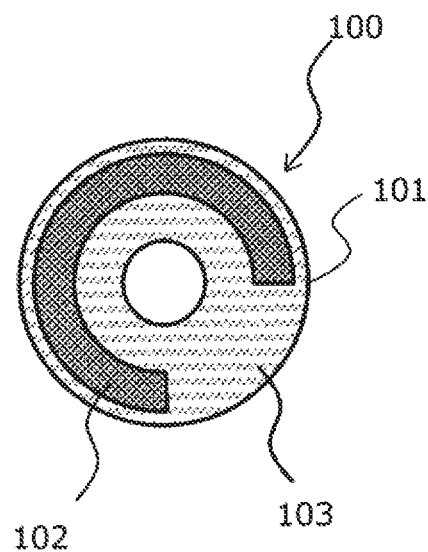
FIG. 2 is a plan view of phosphor wheel 100 as seen from the direction of irradiation of LD light.

FIG. 2 is a plan view of phosphor wheel 100 as seen from the direction of irradiation of LD light.

Substrate 101 that makes up phosphor wheel 100 is constituted by a metal that reflects LD light that is the excitation light. Substrate 101 is a component used while being rotated by a motor (not shown in the figure) and is therefore shaped as a disk that is irradiated by LD light at positions that are equidistant from the center of rotation. Phosphor 102 that emits fluorescent light in response to irradiation of LD light and reflecting surface 103 in which substrate 101 is exposed as is and that reflects LD light are formed at the positions of irradiation of LD light. Phosphor 102 uses a material that emits yellow fluorescent light in response to blue excitation light.

Figure 3:
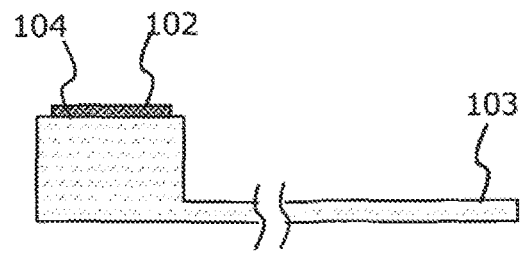
FIG. 3 is a partial side view as seen from the direction perpendicular to the optical axis of LD light and is a view of the state of irradiation of the LD light.
Figure 4:
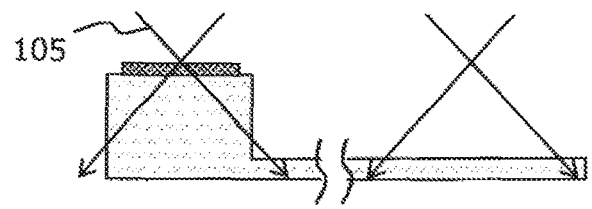
FIG. 4 is a partial side view as seen from the direction perpendicular to the optical axis of LD light and is a view showing the state of irradiation of the LD light.

FIG. 3 and FIG. 4 show the state of irradiation of LD light and are partial side views as seen from the direction perpendicular to the optical axis of the LD light. In FIG. 3 and FIG. 4, the LD light is irradiated downward from the upper side of the figure. Here, phosphor-supporting surface 104 on which phosphor 102 is formed and reflecting surface 103 are formed in steps so as to both be parallel and have a distance between them with respect to the direction of incidence of LD light that is perpendicular to each surface. Phosphor 102 is formed at a uniform thickness on phosphor-supporting surface 104 by a coating or adhesion process. Reflecting surface 103 and the surface of phosphor 102 are formed with steps that are both mutually parallel and at a distance from each other with respect to the direction of incidence of LD light that is perpendicular to each surface.

As shown in FIG. 4, blue LD light 105 that is the excitation light is irradiated via an optical system (lenses 402 and 405) that forms a focal point on the surface of phosphor 102. As a result, LD light 105 that is irradiated upon phosphor 102 has a smaller irradiation area, with the results that the power density of this irradiation area is high, the phosphor light output is higher, and the obtained etendue is smaller. Smaller etendue means an improvement of the efficiency of the light-emitting unit and an overall improvement in the efficiency in the projector device that uses this unit.

On the other hand, LD light 105 that is irradiated upon reflecting surface 103 that is one step lower than phosphor-supporting surface 104 on which phosphor 102 is formed is irradiated in a state that has undergone diffusion after having once been focused, and as a result, the LD light has a larger irradiation area than the state of irradiation upon phosphor 102, and moreover, has lower power density. As a result, the load upon reflecting surface 103 is reduced and the speed of deterioration of reflecting surface 103 is thus reduced, whereby an improvement in the life of phosphor wheel 100 overall can be extended and the reliability can be enhanced.

In the present exemplary embodiment as described above, a configuration is adopted such that LD light 105 that is the excitation light forms a focal point on the surface of phosphor 102 and the emitted fluorescent light therefore becomes perfectly diffuse light. In order that most of the perfectly diffuse light that is emitted be subsequently taken in by an optical component group, the distance between the optical component group and the phosphor is therefore preferably short. To this end, a configuration is adopted in which phosphor-supporting surface 104 on which phosphor 102 is formed is arranged closer to the side of irradiation of LD light 105 than reflecting surface 103 and thus closer to optical component group 406.

Phosphor-supporting surface 104 and reflecting surface 103 are consequently arranged on non-flush surfaces, but due to the difference in the radiation angles in the fluorescent light that is perfectly diffuse light and the specular reflection light of LD light 105, in the present exemplary embodiment, the optical system that follows the light-emitting unit that is provided with phosphor wheel 100 is made suitable for both the fluorescent light and the reflected LD light by designing the optical system that causes formation of a focal point on the surface of phosphor 102 that is formed on phosphor-supporting surface 104.

Further, changing the height of the steps provided on substrate 101 of phosphor wheel 100 enables a change of the size of the area of irradiation of LD light 105 on reflecting surface 103 in conjunction with, for example, the power of LD light 105 and the resistance of reflecting surface 103.

As described hereinabove, irradiating LD light 105 upon phosphor wheel 100 that is rotating causes yellow fluorescent light and blue LD light to be irradiated in a time series from phosphor wheel 100 toward polarization beam splitter 403. At this time, the blue LD light is set to P-polarized light by having passed twice through phase difference plate 404, whereby yellow fluorescent light and blue LD light are both transmitted through polarization beam splitter 403 and irradiated upon image projection unit 408 as illumination light 407. In this way, polarization beam splitter 403 and phase difference plate 404 act as a mixing optical system that allows the passage of reflected light and fluorescent light that are emitted by phosphor wheel 100.

In FIG. 1, illumination light 407 and the LD light that is irradiated upon phosphor wheel 100 are indicated as having different optical axes, but this representation is for the purpose of clarifying the state of advance of each light beam, and these light beams actually pass along the same axis. In addition, phosphor wheel 100 is also shown in an oblique state with respect to the LD light in FIG. 1, but this representation is again for the purpose of clarifying the reflected state, and the LD light is actually irradiated perpendicular to phosphor 102 and reflecting surface 103.

Image projection unit 408 is provided with a color separation optical system that separates, of illumination light 407 that is irradiated, red and green for the yellow fluorescent light and then uses this separated light together with the blue LD light as red, green, and blue illumination light.

Image projection unit 408 is further provided with image-forming elements such as DMDs (Digital Micro-mirror Devices) or LCDs (Liquid Crystal Displays) provided for each color, and further, image synthesizing/projecting units that synthesize and project image light of each color that is formed by each image-forming element and supplies as output projected light 409 from the image synthesizing/projecting unit.

Second Exemplary Embodiment

Figure 5:
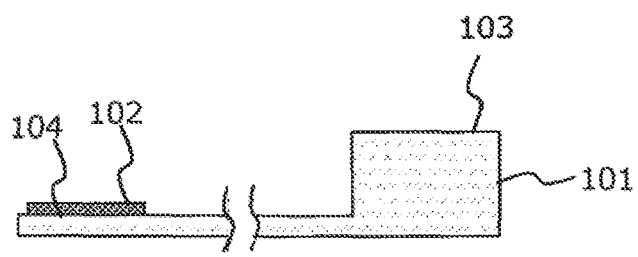
FIG. 5 is a partial side view as seen from the direction perpendicular to the optical axis of LD light and is a view showing the state of irradiation of the LD light.
Figure 6:
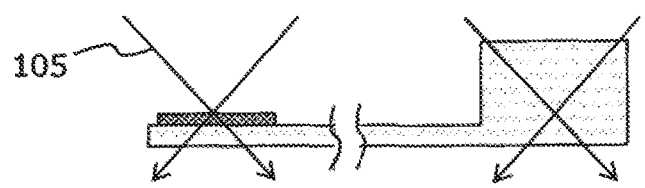
FIG. 6 is a partial side view as seen from the direction perpendicular to the optical axis of LD light and is a view showing the irradiation state of the LD light.

The second exemplary embodiment according to the present invention is next described. FIG. 5 and FIG. 6 are partial side views that show the construction of the phosphor wheel that is a principle part of the second exemplary embodiment according to the present invention. Apart from the phosphor wheel, the configuration is similar to that of the first exemplary embodiment shown in FIG. 1.

Similar to FIG. 3 and FIG. 4, FIG. 5 and FIG. 6 are views showing the state of irradiation of LD light 105 and are partial side views as seen from the direction perpendicular to the optical axis of LD light 105. In FIG. 5 and FIG. 6, LD light 105 is irradiated downward from the upper side of the figure. Here, reflecting surface 103 and phosphor-supporting surface 104 on which phosphor 102 is formed are formed in steps such that reflecting surface 103 and phosphor-supporting surface 104 are both parallel and at a distance from each other with respect to the direction of irradiation of LD light that is perpendicular to each surface. Phosphor 102 is formed at a uniform thickness on phosphor-supporting surface 104 by a coating or adhesion process.

Although phosphor-supporting surface 104 is arranged to precede reflecting surface 103 in the direction of incidence of LD light 105 in the first exemplary embodiment, as shown in FIG. 5, the present exemplary embodiment is configured with reflecting surface 103 arranged to precede phosphor-supporting surface 104 in the direction of incidence of LD light 105 and phosphor-supporting surface 104 is arranged to follow reflecting surface 103 in the direction of incidence of LD light 105.

As shown in FIG. 6, in the present exemplary embodiment, blue LD light 105 that is the excitation light is irradiated via an optical system (lenses 402 and 405) that forms a focal point on the surface of phosphor 102 similar to the first exemplary embodiment, and as a result, LD light 105 that is irradiated upon reflecting surface 103 is irradiated in a state that diverges from the focal point position. The point of difference between the present exemplary embodiment and the first exemplary embodiment is that LD light 105 that is irradiated upon reflecting surface 103 is in a state that precedes the formation of a focal point. In the case of the present exemplary embodiment as well, the irradiation area of LD light 105 on the surface of phosphor 102 is small and the irradiation area of LD light 105 on reflecting surface 103 is large, whereby not only is the etendue as a light-emitting unit small, but the load upon reflecting surface 103 is reduced.

Although the present exemplary embodiment is of a configuration in which phosphor 102 and reflecting surface 103 are arranged on non-flush surfaces, and moreover, although the surface of phosphor 102 is farther from optical component group 406, because the radiation angles differ for the perfectly diffuse fluorescent light and the specular reflection light of LD light 105, the optical system that follows the light-emitting unit that is provided with a phosphor wheel that is made suitable for both fluorescent light and reflected LD light by designing the optical system in conjunction with the surface of phosphor 102.

In addition, the size of the irradiation area of LD light 105 on reflecting surface 103 can be varied by changing the height of the steps provided in the substrate of the phosphor wheel in accordance with the power of LD light 105 and the resistance of reflecting surface 103.

Third Exemplary Embodiment

The third exemplary embodiment according to the present invention is next described. Because the configuration of the present exemplary embodiment is similar to that of the first exemplary embodiment shown in FIG. 1 apart from the phosphor wheel, only the configuration of the phosphor wheel will be described.

Figure 7:
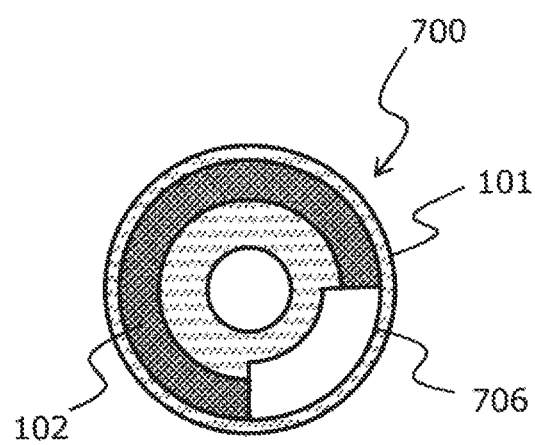
FIG. 7 is a plan view as seen from the direction of irradiation of LD light of phosphor wheel 700 according to the third exemplary embodiment of the present invention.
Figure 8:
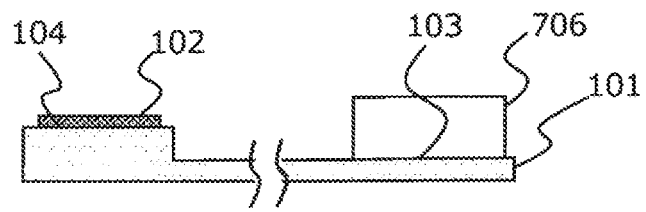
FIG. 8 is a partial side view as seen from the direction perpendicular to the optical axis of LD light and is a view showing the irradiation state of the LD light.
Figure 9:
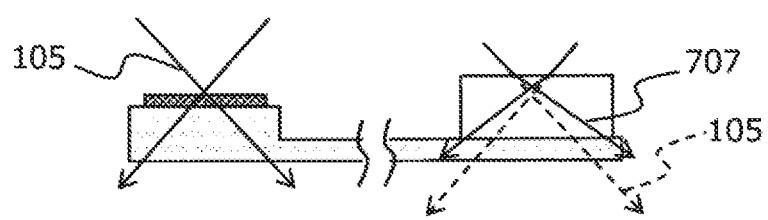
FIG. 9 is a partial side view as seen from the direction perpendicular to the optical axis of LD light and is a view showing the state of irradiation of the LD light.

FIG. 7 is a plan view of phosphor wheel 700 according to the present exemplary embodiment as seen from the direction of irradiation of LD light, and FIG. 8 and FIG. 9 are partial side views as seen from the direction perpendicular to the optical axis of LD light 105 and are views showing the state of irradiation of LD light 105.

Phosphor wheel 700 in the present exemplary embodiment is a component provided with glass 706 on reflecting surface 103 of phosphor wheel 100 shown in FIGS. 2 to 4. Glass 706 is a component that is used as a material having a refractive index, and any material other than glass may be used as long as it has a refractive index.

As shown in FIG. 9, LD light 105 that is incident to glass 706 becomes refracted light 707 that has been refracted, and because the focal point position is moved forward compared to LD light 105 in a case in which glass 706 is not provided, the irradiation area on reflecting surface 103 is greater.

The irradiation area of refracted light 707 on reflecting surface 103 is determined by, for example, the height and refractive index of glass 706 and the angle of incidence of LD light 105 to glass 706. Because changing the type of glass 706 not only changes the refractive index but also affects the refracted state of refracted light 707, the desired irradiation area of refracted light 707 can be selectively obtained.

In each of the exemplary embodiments of the present invention that are configured as described above, LD light is irradiated that forms a focal point on the surface of the phosphor but that has a large irradiation area that diverges from the position of the focal point on the reflecting surface, and as a result, not only can the irradiation area on the phosphor be made smaller to further decrease the etendue of the phosphor that is the perfectly diffused light, but the load upon optical components exerted by LD light having high power density can be reduced, whereby an improvement in the efficiency of the light-emitting unit and a reduction in the load upon the reflecting surface can be simultaneously achieved.

The reduction of the etendue and the ability to efficiently use phosphor light means that the quantity of light that behaves as unnecessary light such as stray light can be decreased. As a result, image quality improves. In addition, the quantity of light that is converted to thermal energy decreases, whereby, compared to the prior art, the cooling characteristics that the entire device requires can be reduced. As a result, many benefits can be obtained, including not only lower costs, but also the realization of a device having smaller size and lower power consumption.

In each of the exemplary embodiments described above, explanation was presented in which an LD was used as the light source that emits excitation light, but the problem recognized by present invention arises due to extremely strong excitation light. As a result, the light source that emits the excitation light is not limited to an LD, and replacing the LD in each of the exemplary embodiments with, for example, a light source that condenses the light of a plurality of light sources, and moreover, supplies linearly polarized light by a polarization conversion device may also be considered.

EXPLANATION OF THE REFERENCE NUMBERS 100, 700 phosphor wheel
101 substrate
102 phosphor
103 reflecting surface
104 phosphor-supporting surface
105 LD light
401 LD
402, 405 lens
403 polarization beam splitter
404 phase difference plate
406 optical component group
408 image projection unit
706 glass
707 refracted light

The invention claimed is:

1. A phosphor wheel, comprising:
    a phosphor-supporting surface on which is formed a phosphor that emits fluorescent light in response to incident light; and
    a reflecting surface that reflects said incident light,
    wherein said phosphor-supporting surface and said reflecting surface are formed both to be parallel and to have a mutual distance between said phosphor-supporting surface and said reflecting surface in a perpendicular direction of each surface, and
    wherein a surface of said phosphor and said reflecting surface are formed with steps having different heights.

2. The phosphor wheel according to claim 1, wherein said surface of said phosphor and said reflecting surface are formed so as both to be parallel and to have a mutual distance between said surface of said phosphor and said reflecting surface in the perpendicular direction of each surface.

3. The phosphor wheel according to claim 2, wherein, in the perpendicular direction of each surface, the distance between said surface of said phosphor and said reflecting surface is the same.

4. The phosphor wheel according to claim 1, wherein said phosphor-supporting surface is formed to precede said reflecting surface in a direction of incidence of said incident light.

5. The phosphor wheel according to claim 4, further comprising:
    a material having a refractive index that is provided on said reflecting surface.

6. The phosphor wheel according to claim 1, wherein said reflecting surface is formed to precede said phosphor-supporting surface in a direction of incidence of said incident light.

7. A light-emitting unit, comprising:
    the phosphor wheel according to claim 1;
    a light source that supplies light that comprises said incident light;
    a mixing optical system that reflects output light of said light source in a direction of said phosphor wheel and that transmits the fluorescent light and reflected light that are emitted by said phosphor; and
    a lens that causes output light of said light source to form a focal point on a surface of said phosphor,
    wherein said light-emitting unit supplies as output reflected light and fluorescent light that are emitted by said phosphor wheel that have been transmitted through said mixing optical system.

8. The light-emitting unit according to claim 7, wherein said light source supplies first linearly polarized light of a first color, and
    wherein said mixing optical system comprises:
        a polarization beam splitter that reflects said first linearly polarized light of the first color toward said phosphor wheel and allows passage of second linearly polarized light of the first color and said fluorescent light; and
        a phase difference plate that is provided between said polarization beam splitter and said phosphor wheel and that converts said first linearly polarized light of the first color to said second linearly polarized light of the first color when the light has passed through said phase difference plate two times.

9. A projector, comprising:
    the light-emitting unit according to claim 7, and
    an image projection unit that uses reflected light and fluorescent light that were emitted by said phosphor wheel that were supplied from said light-emitting unit to form and project image light.

10. The phosphor wheel according to claim 1, wherein said phosphor-supporting surface and said reflecting surface are formed with steps having different heights.

11. The phosphor wheel according to claim 1, wherein, in the perpendicular direction of each surface, the distance between said phosphor-supporting surface and said reflecting surface is the same.

12. The phosphor wheel according to claim 1, wherein said surface of said phosphor and said reflecting surface are not in a same plane surface.

13. The phosphor wheel according to claim 1, wherein said reflecting surface and said phosphor-supporting surface are not in a same plane surface.

14. The phosphor wheel according to claim 1, wherein, in a stacking direction of said phosphor on said phosphor-supporting surface, said reflecting surface is located outside an overlapping area of said phosphor and said phosphor-supporting surface.

15. The phosphor wheel according to claim 1, wherein, in a stacking direction of said phosphor on said phosphor-supporting surface, said reflecting surface is completely located outside an overlapping area of said phosphor and said phosphor-supporting surface.

16. The phosphor wheel according to claim 1, wherein, in a stacking direction of said phosphor on said phosphor-supporting surface, said reflecting surface is exposed from said phosphor.

17. The phosphor wheel according to claim 1, wherein, in a stacking direction of said phosphor on said phosphor-supporting surface, a part of said phosphor-supporting surface is exposed from said phosphor.

18. The phosphor wheel according to claim 1, wherein said phosphor-supporting surface and said phosphor-supporting surface include surfaces of a base of said phosphor wheel.

19. The phosphor wheel according to claim 18, wherein a bottom surface of the base of said phosphor wheel extends, as a flat surface, below said phosphor and said reflecting surface, and wherein, with respect to the bottom surface of the base of said phosphor wheel, a height of said reflecting surface is different from a height of said surface of said phosphor.

20. The phosphor wheel according to claim 1, wherein said phosphor-supporting surface and said reflecting surface are other than co-planar.

\* \* \* \* \*